United States Patent [19]

Fournie et al.

[11] 4,426,086

[45] Jan. 17, 1984

[54] ANNULAR SEAL AND METHOD OF USE

[75] Inventors: Rene Fournie, Pau; Francois Besnard, Lescar; Jacques Hons-Olivier, Paris; Alexandre Pierre, La Garenne Colombes, all of France

[73] Assignee: Societe Nationale Elf Aquitaine (Prod.), Courbevoie, France

[21] Appl. No.: 409,636

[22] Filed: Aug. 19, 1982

[30] Foreign Application Priority Data

Sep. 3, 1981 [FR] France ................. 81 16739

[51] Int. Cl.³ .................. F16J 15/12; F16J 15/32
[52] U.S. Cl. .................................. 277/1; 277/164; 277/189
[58] Field of Search .................. 277/189, 164, 25, 183

[56] References Cited

U.S. PATENT DOCUMENTS

| 2,330,259 | 9/1943 | Baker . | |
|---|---|---|---|
| 3,123,364 | 3/1964 | Ennis | 277/1 |
| 3,554,567 | 1/1971 | Carroll et al. | 277/164 |
| 3,712,115 | 1/1973 | Miller . | |
| 4,050,517 | 9/1977 | Matthews . | |
| 4,260,165 | 4/1981 | Hartelius | 277/189 |

FOREIGN PATENT DOCUMENTS 957601  8/1949  France .

Primary Examiner—Robert I. Smith
Attorney, Agent, or Firm—Poms, Smith, Lande & Rose

[57] ABSTRACT

Seal comprising annular baseplate 5, carried on the surface of shaft 7, and main annular body 2, with annular metal reinforcement 3, comprising a continuous spring cast into the body, said annular body 2 being connected to baseplate 5 via flexible neck 4, and extended by lip 1, the exterior annular surface of which bears on the bore sidewall of tube 6, so that when an axial thrust, exerted by mobile actuator part 9, is applied to said annular body 2, the body is straightened, pivoting with respect to baseplate 5, and lip 1 bears on the sidewall of tube 6.

Applications in the petroleum industry, in particular for the repair of pipes, and testing tubes at high pressures.

11 Claims, 4 Drawing Figures

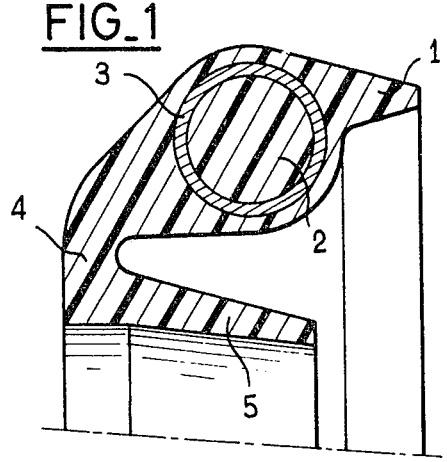
FIG_1
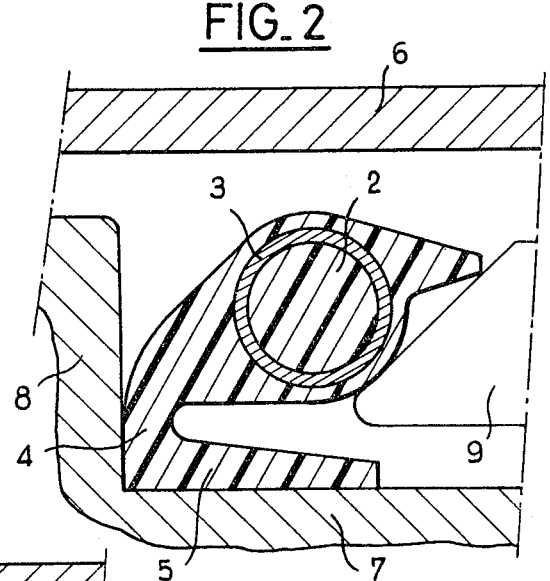
FIG_2
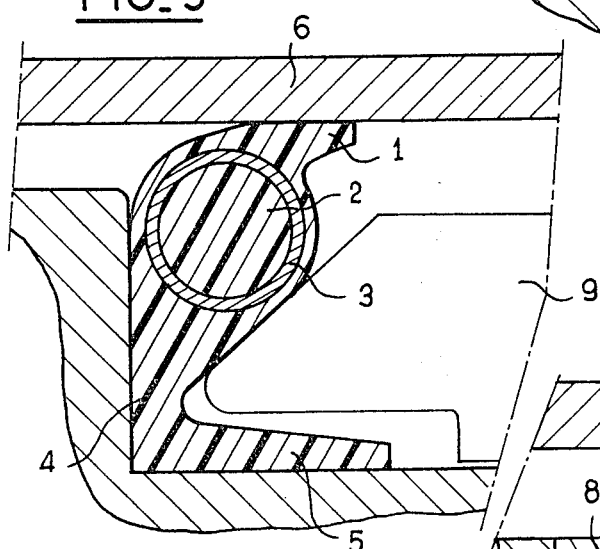
FIG_3
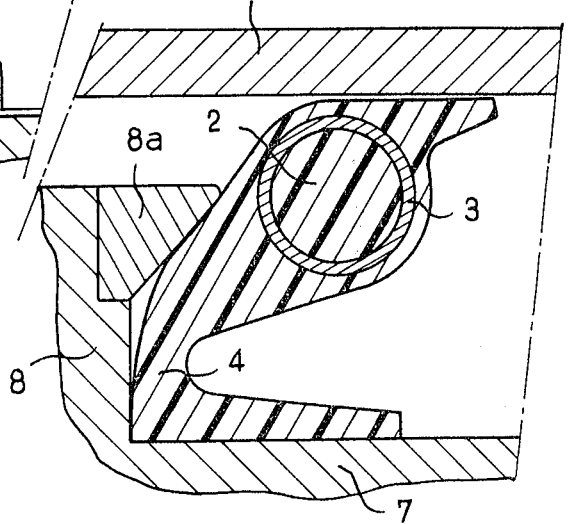
FIG_4

4,426,086

ANNULAR SEAL AND METHOD OF USE

This invention concerns an annular seal in reinforced elastomer, capable of providing seal-tightness at high pressures.

Existing seals of this type provide seal-tightness, in an annular space, between the part on which they are mounted, and the adjacent tube or shaft.

They can be mounted on the shaft, in which case they provide seal-tightness with the bore of a tube by means of a peripheral lip, or, mounted on the sidewall of the tube bore, they provide seal-tightness with a central shaft. In both cases, seal-tightness is obtained by the specific sizing of the lips's circumference, the diameter of the lip being greater to ensure seal-tightness in the bore, and smaller to ensure seal-tightness with the shaft.

An oversize lip presents a number of drawbacks, including the fact that fitting the lip is a delicate operation as there is the risk of damage when the lip is forced into place.

Furthermore, even adhesion of the lip on unmachined rolled or drawn surfaces, can present difficulties resulting from manufacturing tolerances and defective surface conditions.

The invention is designed to overcome these drawbacks, and proposes an annular seal which can be fitted easily and without risk.

The annular seal in reinforced elastomer, designed to provide seal-tightness at high pressures, in an annular space between a central shaft and the bore of a tube surrounding the shaft, is characterized by the fact that it comprises an annular baseplate, suitable for fixing contiguously on the surface of the shaft, and a main annular body, with an annular metal reinforcement, comprising a continuous spring, cast into the body, said annular body being connected to the baseplate by means of a flexible neck, and extended by a lip, the exterior annular surface of which can bear on the sidewall of the tube bore, so that under the axial thrust exerted on said annular body by a mobile actuator part, the body pivots with respect to the baseplate, and the lip bears on the sidewall of the tube bore.

As a result of retraction due to the reinforcement, a seal of this type allows the lip to move off the sealing surface by about 10 mm in the quiescent position so that the seal can be fitted without risk of damage.

Acuation of the seal by a mechanical tipping device, applying the lip against the sidewall with sufficient force, creates an initial seal-tightness which is maintained without further action by said device, when the pressure builds up inside the annular space. The seal of this type is self-sealing, namely it is sufficient to associate an actuator system momentarily with the seal, prior to pressure build-up. Once the pressure has been established, seal tightness is maintained after retraction of the actuator system.

The seal covered by this invention can withstand high pressures up to about 600 bar, even with a large annular space. The mobile actuator parts associated with the seal, can, to advantage, take the form of an annular part designed for translational movement inside the annular space, from an open position of the seal to a closed, seal-tight position, under the effect of a control device, the actuator part having a conical surface at its end facing the seal, designed to exert a thrust on the annular body.

The seating surface for the flexible neck preferably comprises a shoulder on the shaft, adjacent to the annular surface of the shaft on which the baseplate is fixed.

This shoulder normally presents a face approximately perpendicular to the annular surface of the shaft.

According to a preferred method of execution, the shoulder has a conical form, protruding towards the seal recess, at least for its peripheral parts.

Other characteristics of the invention will emerge from the following description of a method of execution, and variant method, for the device covered by the invention.

In the following drawings:

FIG. 1 shows a section view of a seal as covered by the invention;

FIG. 2 shows a section view of the assembled seal, in the quiescent position;

FIG. 3 shows a section view of the assembled seal, in the working position, and

FIG. 4 shows a section view of the assembled seal, in the working position in a recess with modified counter.

The seal shown is of the type mounted on a central shaft, and providing seal-tightness with the tube bore. The seal is generally in an elastomer, such as synthetic rubber of appropriate resiliance and hardness. The seal comprises baseplate 5, connected to main annular body 2 by reduced section flexible neck 4, the neck acting as an articulation. The other end of body 2 incorporates lip 1, which provides the actual seal. Annular metal reinforcement 3, in the form of a continuous spring, is cast into the full thickness and over the total circumference of the body 2, giving the body remarkable expansion and retraction characteristics. This seal is mounted on annular surface 7 of a shaft, machined for this purpose to give an attachment seal for the seal and having a shoulder approximately perpendicular to annular surface 7. Baseplate 5 is applied to this part, and bears on said shoulder.

The shaft and seal are inserted without difficulty inside the bore of tube 6, for which seal-tightness is required, as spring 3 is in the retracted position (FIG. 2).

The mechanical or hydraulic actuator system, the only part of which shown is element 9, having a conical face on its end oriented towards the seal, produces an axial thrust designed to straighten main body 2, when it pivots on flexible neck 4.

Under the effect of element 9, body 2 bears on shaft shoulder 8 (FIG. 3) and lip 1 is pressed against the sidewall of tube 6.

In the variant version shown in FIG. 4, the counter of the seal recess has been modified, shoulder 8 machined in shaft 7 having protrusion 8a oriented towards the seal recess, in its peripheral part. When an axial thrust is exerted by actuator element 9, the moment when annular body 2 bears on shoulder 8 occurs earlier. This arrangement also makes it possible to apply lip 1 against the bore of tube 6 over a greater surface area.

Under the effect of the pressure, this seal is held in this position, even when the effect of the actuator system is removed. As the pressure increases, the seal tends to extrude via the annular space. If the seal was in unreinforced elastomer, it would creep even at low pressure. One of the functions of the metal reinforcement is to increase the mechanical resistance of the elastomer to high pressures, given the large annular space.

When the pressure is removed in the chamber upstream from the seal, the seal retracts automatically under the action of the spring, and can be removed as easily as it was fitted.

The seal described in the example has undergone a seal-tightness test, using a tube with a diameter of 20", and with an annular space of 15 mm. The wire of the spring reinforcement had a 3.5×3.5 mm² section. The pressure applied was approx. 600 bars.

The seal covered by this invention can find a wide range of applications in the petroleum industry, in particular for the repair of underwater pipelines, wherever the pressures involved prevent the use of conventional seals.

A further application for the seal covered by this invention, is to be found in the field of testing, where a wide range of equipment, required to withstand very high pressures, is involved. The invention is not restricted to the method of execution described, and many variants are possible without going outside the scope of the invention. The method of fixing the seal to a support element can take different forms. Likewise, the seal actuator system, used to pivot the main body, can be any mechanical, hydraulic, magnetic or other type of system.

We claim:

1. An annular seal means designed to provide seal-tightness at high pressures in an annular space between a central shaft and the bore sidewall of a tube surrounding the shaft, characterized by said seal means comprises a seal body of reinforced elastomeric material including an annular base plate 5 seated on the surface of shaft 7, an annular body portion 2 provided with annular metal reinforcement 3 comprising a continuous spring cast into the body portion, said annular body portion 2 being connected to base plate 5, via a flexible neck 4;

said annular body portion being radially outwardly extended by lip 1, the exterior annular surface of said lip being designed to seal against the bore sidewall of tube 6;

and a mobile actuator for exerting axial thrust on said annular body portion 2 to pivot said body portion 2 with respect to base plate 5, and to radially outwardly extend lip 1 against the sidewall of tube 6;

whereby when said seal means is in the quiescent position, annular body portion 2 articulated on base plate 5 by neck 4, is held in an inclined position relative to base plate 5, as a result of the retracted position of reinforcement spring 3, and when the seal means is actuated, annular body portion 2 bears on shoulder 8.

2. Annular seal means as per claim 1, characterized by the fact that said mobile actuator is an annular element capable of translational displacement inside the annular space, from a position where the seal means is open to a position of seal-tight closure, under the effect of a controlled device, said actuator having a conical surface on its end facing the seal means, designed to exert an axial and radially outwardly directed thrust on annular body portion 2.

3. Seal as per claim 1, characterized by the fact that said surface on shaft 7 includes a shoulder 8 providing a seating surface for flexible neck 4.

4. Seal as per claim 3 characterized by the fact that shoulder 8 is approximately perpendicular to shaft 7.

5. Seal as per claim 3 characterized by the fact that shoulder 8 has a conical surface 8a, at least for its peripheral part, protruding towards the seal means.

6. A method for installation of the annular seal means as stated in claim 1 characterized by the steps of:

introducing said seal means in said annular space between said shaft and said tube for which seal tightness is required at high pressures, fixing the base plate of said seal means to said shaft, said shaft having an annular shoulder designed to serve as a bearing face for the main annular body portion of the seal in an actuated sealing position, producing an axial thrust against said annular body portion by a mobile actuator part to circumferentially extend the spring and to cause straightening and bearing of the annular body portion against said shoulder and applying said lip with force against the sidewall of the tube under the effect of said thrust.

7. An annular seal member as stated in claim 1 wherein said annular body portion includes a surface radially inwardly of said lip extension adapted to be contacted by pressure fluid within said annular space for sealing contact of said lip extension with said tube surfaces.

8. An annular seal member of elastomeric material for sealing under high pressure spaced cylindrical surfaces as between a shaft having a selected outer diameter and a tube having an internal diameter greater than the shaft outer diameter and providing a predetermined annular space comprising:

a baseplate portion adapted to the seat and seal on said shaft;

an annular body portion spaced from said baseplate portion and having a lip extension;

a flexible portion interconnecting said baseplate and annular body portions;

a continuous spring imbedded in said annular body portion and in normal relaxed condition resiliently holding said body portion and lip extension in retracted position with the lip extension having an outer diameter less than the inner diameter of the tube whereby said lip extension is out of contact with the internal surfaces of the tube in the absence of application of pressure in said annular space.

9. An annular seal member as stated in claim 9 wherein said annular body portion includes a surface radially inwardly of said lip extension adapted to be contacted by an actuator member for radially outwardly expanding the annular body portion and the lip extension for sealing contact with the tube surfaces.

10. An annular seal member as stated in claim 9 wherein said shaft includes a shoulder provided with an inclined surface extending radially outwardly and towards said annular body portion to enlarge the contact area of said lip extension under operative pressure sealing conditions.

11. In a method of installing and operating an annular seal member of elastomeric material mounted on a shaft in concentric spaced relation within an outer tube, said seal member including a baseplate portion, an annular body portion, a flexible portion interconnecting the baseplate and body portions, a resilient means imbedded within said annular body portion, and a lip extension on the body portion including the steps of:

mounting said seal member on said shaft in a restrained position against movement in at least one axial direction;

passing said shaft and seal member into said tube with said spring in relaxed contracted position and said lip extension out of contact and in spaced relation to the interior surfaces of the tube;

imparting axially directed thrust forces against said seal member to radially expand said annular portion against the resistance of said spring and to circumferentially urge said lip extension into sealing contact with the interior surfaces of said tube;

and maintaining said axial thrust forces against said seal body by introducing pressure fluid into the annular space between said shaft and tube.

* * * * *

UNITED STATES PATENT AND TRADEMARK OFFICE
CERTIFICATE OF CORRECTION

PATENT NO. : 4,426,086
DATED : January 17, 1984
INVENTOR(S) : Rene Fournie, Francois Besnard, Jacques Hons-Olivier Alexandre Pierre It is certified that error appears in the above-identified patent and that said Letters Patent are hereby corrected as shown below:

The name of the assignee is Societe Nationale Elf Aquitaine (Production) instead of "Societe Nationale Elf Aquitaine (Prod.)

Signed and Sealed this

Seventeenth Day of July 1984

[SEAL]

Attest:

GERALD J. MOSSINGHOFF

Attesting Officer    Commissioner of Patents and Trademarks